W. K. FOSTER.
Tire-Tightener.
No. 45,150. Patented Nov. 22, 1864.
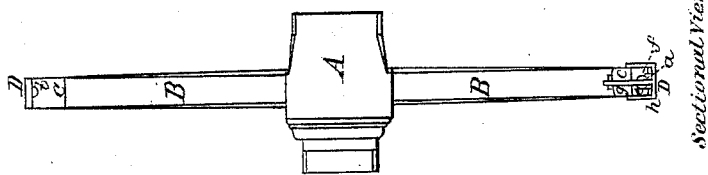
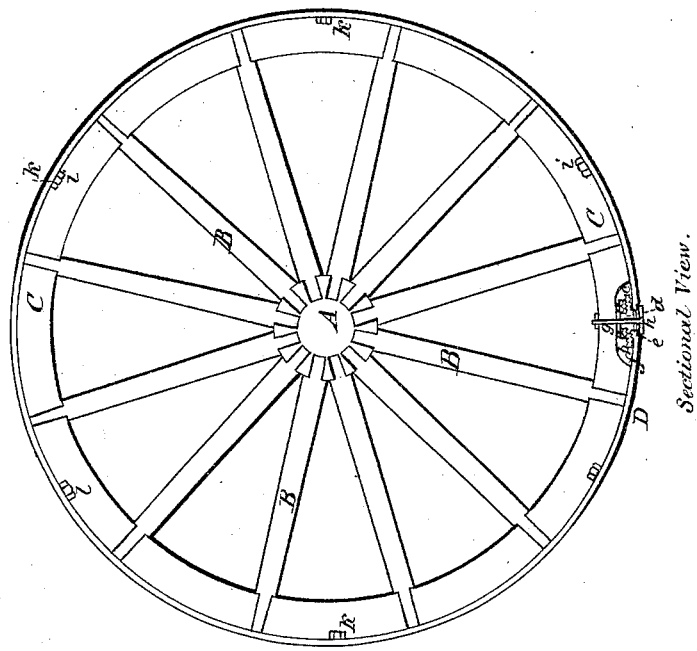
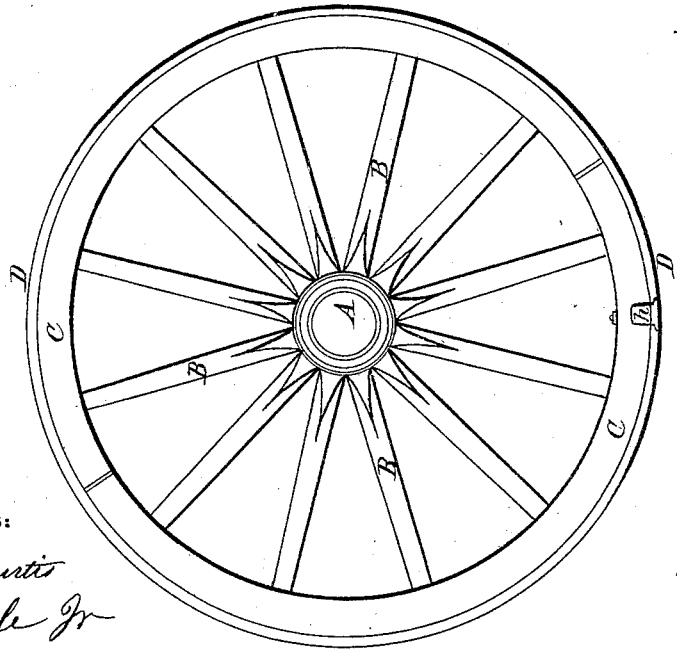
Witnesses: Inventor:

United States Patent Office.

WALTER K. FOSTER, OF BANGOR, MAINE.

IMPROVEMENT IN CARRIAGE-WHEELS.

Specification forming part of Letters Patent No. 45,150, dated November 22, 1864.

*To all whom it may concern:*

Be it known that I, WALTER K. FOSTER, of Bangor, of the county of Penobscot, of the State of Maine, have made a new and useful invention having reference to Carriage-Wheels; and I do hereby declare the same to be fully described in the following specification and represented in the accompanying drawings, of which—

Figure 1 is a side view, Fig. 2 a longitudinal section, and Fig. 3 a transverse section, of a carriage-wheel provided with my invention, the main purpose of such invention being to confine a tire to the body of a wheel and enable a person to readily tighten or contract such tire on its felly as circumstances may require.

It is well known that a carriage-wheel tire, while in use, is liable to become more or less stretched or lengthened by rolling in contact with the ground, in which case, to cause it to properly fit the felly, it becomes necessary to remove it therefrom, reduce it in length, and reset it on the felly, all of which operations require the expenditure of much time and labor.

With my invention the tire can be contracted while on the felly, the whole being accomplished with little labor and expense, and in a manner to maintain the tire on the felly with all requisite firmness.

In the drawings, A denotes the hub, B B B, &c., the spokes, C the felly, and D the tire, of a wheel in their ordinary relations to each other.

In my improvement the tire is not a continuous hoop or circle, but consists of a band of metal carried nearly around the circumference of the felly, and provided at or near its terminations with two projections, $a\ a$, which have female screws made through them for the reception of two male screws, $b\ c$. These latter are extended in opposite directions from a cylindrical head, $d$, arranged between the two projections $a\ a$, in manner as shown in Fig. 2. One of the screws $b\ c$ is to be a right-threaded and the other a left-threaded screw, in order that when the two are revolved in one direction they may mutually operate in either contracting or expanding the tire. One or more holes, $e$, are made diametrically through the head $d$. A suitable recess, $f$, formed in the felly, receives the projections $a\ a$ and their contractile screws.

A screw-bolt, $g$, when passed into or through the felly and into or through one of the holes $e$ of the head $d$, serves to prevent the said head and its contractile screws from being revolved. This bolt I connect with or extend from a piece of metal or clasp, $h$, which is placed in the space between the two ends of the tire, and serves as a projection for the head $d$ as well as to keep the tire-recess $f$ from being clogged with dirt. Furthermore, from the inner circumference of the tire, I extend a series of tenons or projections, $i\ i\ i$, which respectively are to enter into the felly each recess $k$, for the reception of any one of the tenons, being somewhat elongated longitudinally of the wheel and of a width to correspond with that of the tenon. These tenons or projections serve to prevent lateral strains on the tire from deranging the tire relatively to the felly.

In order to set up the tire when it may have become loosened on the felly, it will first be necessary to withdraw the screw-bolt $g$ from the screw-head $d$, after which, by means of a lever inserted in one of or successively in the holes of the head, such head, with its screws, may be revolved the necessary amount to produce the proper or desirable contraction of the tire, which having been effected, the screw-bolt may be restored to its place in the head and felly, and will serve to keep the head and its screws from being revolved while the wheel may be in use.

I claim—

1. The combination of the holding screw-bolt $g$ with the wheel and the tire-contracting mechanism thereof.

2. The combination of the series of tenons $i\ i\ i$ with the wheel and the tire-contracting mechanism thereof.

WALTER K. FOSTER.

Witnesses:
R. H. EDDY,
F. P. HALE, Jr.